(12) United States Patent
Binek et al.

(10) Patent No.: US 12,345,207 B1
(45) Date of Patent: Jul. 1, 2025

(54) CENTRALIZED MULTI ENGINE STARTUP SYSTEM FOR PALLETIZED APPLICATIONS

(71) Applicant: RTX Corporation, Farmington, CT (US)

(72) Inventors: Lawrence A. Binek, Glastonbury, CT (US); Yoel Bugin, Port St. Lucie, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/399,816

(22) Filed: Dec. 29, 2023

(51) Int. Cl.
*F02C 7/32* (2006.01)
*B64D 1/12* (2006.01)

(52) U.S. Cl.
CPC .................. *F02C 7/32* (2013.01); *B64D 1/12* (2013.01); *F05D 2220/323* (2013.01)

(58) Field of Classification Search
CPC ... B64D 1/00; B64D 1/02; B64D 1/04; B64D 1/06; B64D 1/08; B64D 1/10; B64D 1/12; B64U 80/82; F02C 7/32; F41A 5/18; F41F 3/00; F41F 3/0413; F41F 3/042; F41F 3/045; F41F 3/0455; F41F 3/052; F41F 3/055; F41F 3/06; F41F 3/065; F41F 3/073; F41F 7/00; H01R 43/26
USPC ............................................ 244/58; 89/1.813
See application file for complete search history.

(56) References Cited

U.S. PATENT DOCUMENTS

| | | | | |
|---|---|---|---|---|
| 2,803,168 A * | 8/1957 | Matge | ...................... | F41A 19/58 89/1.814 |
| 3,998,408 A * | 12/1976 | Caldwell, Jr. | ......... | B63B 22/003 441/3 |
| 4,161,301 A * | 7/1979 | Beardsley | ................ | B64D 1/10 89/1.51 |
| 4,208,949 A | 6/1980 | Boilsen | | |
| 4,256,012 A * | 3/1981 | Cowart | .................... | B64D 1/08 89/1.51 |
| 4,489,638 A | 12/1984 | Bastian et al. | | |
| 5,136,838 A | 8/1992 | Shekleton et al. | | |
| 6,070,832 A * | 6/2000 | Redd | ........................ | B64D 1/12 14/71.1 |
| 6,868,769 B1 * | 3/2005 | Wright | .................... | F41F 3/042 89/1.807 |
| 7,338,015 B1 * | 3/2008 | Sarigul-Klijn | ........... | B64D 1/04 244/137.1 |

(Continued)

FOREIGN PATENT DOCUMENTS

| | | | | |
|---|---|---|---|---|
| EP | 1806287 A2 * | 7/2007 | ............... | B64D 1/12 |
| GB | 818383 A | 8/1959 | | |

(Continued)

OTHER PUBLICATIONS

Extended European Search Report for counterpart EP Application No. 24221872.5 dated Mar. 24, 2025.

*Primary Examiner* — Joshua E Rodden

(74) *Attorney, Agent, or Firm* — Bachman & LaPointe, P.C.

(57) ABSTRACT

A centralized multi engine startup system including a pallet structure; an energized gas source supported by the pallet structure; an umbilical gas line fluidly coupled to the energized gas source; and a vehicle in operative communication with the umbilical gas line, wherein each of the energized gas source and umbilical gas line are coupled to the pallet structure and remain with the pallet structure responsive to a vehicle launch from the pallet structure.

20 Claims, 2 Drawing Sheets

(56) References Cited

U.S. PATENT DOCUMENTS

| | | | |
|---|---|---|---|
| 7,681,482 B1* | 3/2010 | Kubinski | F41F 3/052 |
| | | | 439/376 |
| 7,926,764 B2* | 4/2011 | Grabmeier | B64D 1/12 |
| | | | 244/137.3 |
| 9,399,514 B2* | 7/2016 | Fox, Jr. | B64D 17/22 |
| 11,591,050 B2 | 2/2023 | Graham et al. | |
| 2011/0168838 A1* | 7/2011 | Hornback | F41F 3/042 |
| | | | 244/63 |
| 2012/0251280 A1* | 10/2012 | Jaurand | B64D 1/12 |
| | | | 414/507 |
| 2013/0167711 A1* | 7/2013 | Zatterqvist | F42B 12/70 |
| | | | 89/1.56 |
| 2016/0176524 A1* | 6/2016 | Fox, Jr. | B64D 1/12 |
| | | | 244/137.3 |
| 2017/0349283 A1* | 12/2017 | Paunicka | B64U 70/20 |
| 2023/0049500 A1* | 2/2023 | Murphy | B64U 70/50 |
| 2023/0322407 A1* | 10/2023 | Miralles | F42B 39/14 |
| | | | 244/63 |

FOREIGN PATENT DOCUMENTS

| | | | | |
|---|---|---|---|---|
| RU | 2664812 C1 | 8/2018 | | |
| WO | WO-2013126111 A2* | 8/2013 | | B64C 39/024 |

* cited by examiner

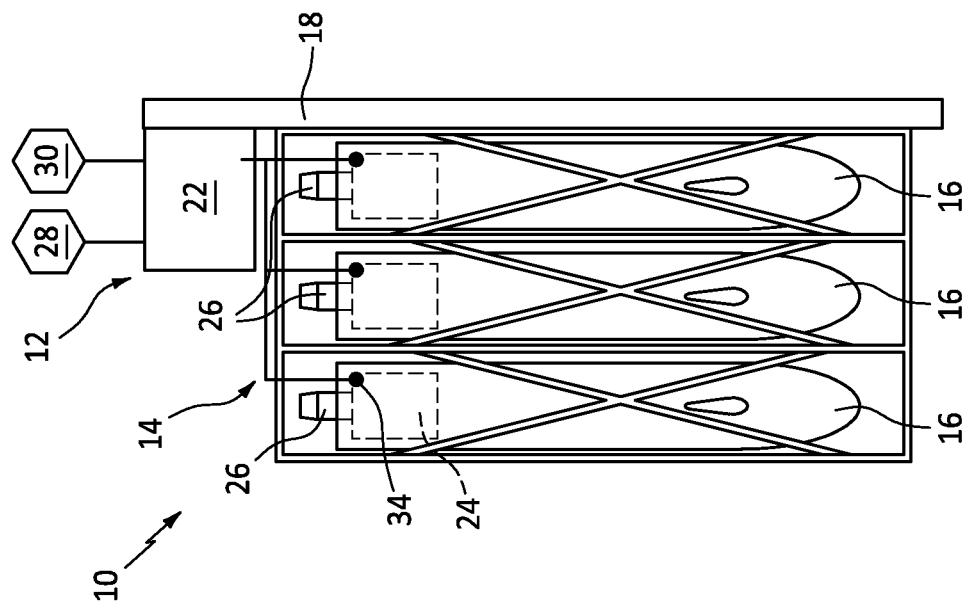
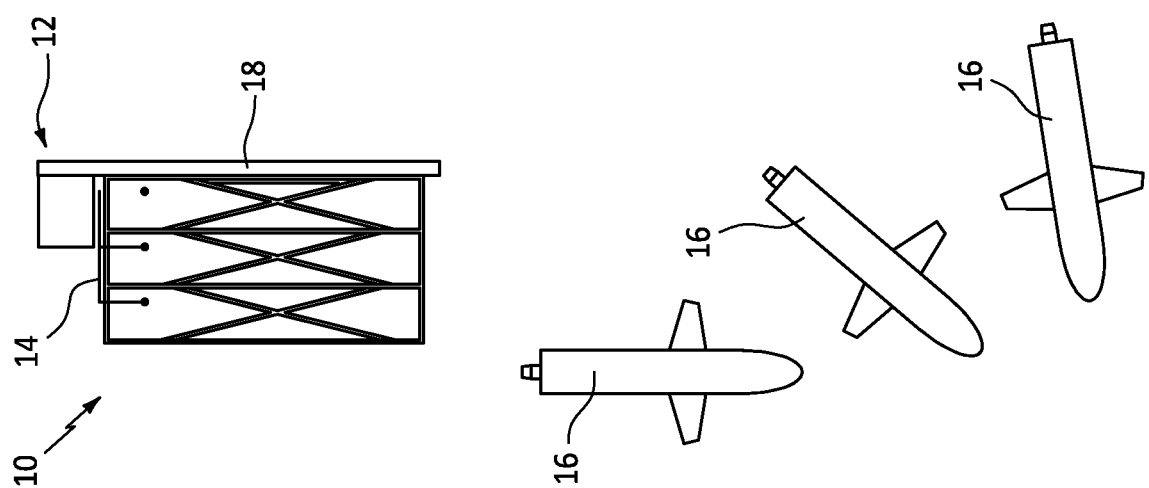

CENTRALIZED MULTI ENGINE STARTUP SYSTEM FOR PALLETIZED APPLICATIONS

BACKGROUND

The present disclosure is directed to the improved launch capability for vehicles with turbojet engines arranged on pallets for launch from an aircraft. Particularly, a centralized approach to starting the vehicle turbojet engines is employed.

Vehicles using small turbojets are being actively pursued for palletized launch. Effectively, a configuration of vehicles is arranged on a pallet which is deployed at altitude from an aircraft. Each vehicle possesses its own start-up capability which is initiated as the vehicle drops from the pallet. The architecture for engine start-up remains on the vehicle for the duration of the mission. Start-up hardware can be expensive and takes up volume in the vehicle. Typically start cartridges and $O_2$ bottles are required to commence engine operation and both elements contain ancillary hardware to attach the module to the engine.

SUMMARY

In accordance with the present disclosure, there is provided centralized multi engine startup system comprising a pallet structure; an energized gas source supported by the pallet structure; an umbilical gas line fluidly coupled to the energized gas source; and a vehicle in operative communication with the umbilical gas line, wherein each of the energized gas source and umbilical gas line are coupled to the pallet structure and remain with the pallet structure responsive to a vehicle launch from the pallet structure.

A further embodiment of any of the foregoing embodiments may additionally and/or alternatively include the energized gas source comprises at least one of a gas generator and a start cartridge.

A further embodiment of any of the foregoing embodiments may additionally and/or alternatively include the gas generator and a start cartridge are configured to produce an energized gas configured to start a gas turbine engine associated with the vehicle.

A further embodiment of any of the foregoing embodiments may additionally and/or alternatively include the umbilical gas line is fluidly coupled to a propulsion module in operative communication with the vehicle.

A further embodiment of any of the foregoing embodiments may additionally and/or alternatively include the centralized multi engine startup system further comprising multiple vehicles supported within the pallet structure, wherein the multiple vehicles are each fluidly coupled to the umbilical gas line.

A further embodiment of any of the foregoing embodiments may additionally and/or alternatively include the centralized multi engine startup system according further comprising a quick release interface in fluid communication with the umbilical gas line, the quick release in operative communication with a propulsion module associated with the vehicle.

A further embodiment of any of the foregoing embodiments may additionally and/or alternatively include the pallet structure being configured to support multiple vehicles for deployment from an aircraft.

In accordance with the present disclosure, there is provided a centralized multi engine startup system comprising a pallet structure; an energized gas source supported by the pallet structure; an umbilical gas line fluidly coupled to the energized gas source; and at least one vehicle in operative communication with the umbilical gas line; a propulsion module fluidly coupled to the umbilical gas line; the propulsion module in operative communication with the at least one vehicle, wherein each of the energized gas source and umbilical gas line are coupled to the pallet structure and remain with the pallet structure responsive to a vehicle launch from the pallet structure.

A further embodiment of any of the foregoing embodiments may additionally and/or alternatively include the propulsion module comprises a gas turbine engine.

A further embodiment of any of the foregoing embodiments may additionally and/or alternatively include the energized gas source comprises at least one of a gas generator and a start cartridge.

A further embodiment of any of the foregoing embodiments may additionally and/or alternatively include the gas generator and a start cartridge are configured to produce an energized gas configured to start a gas turbine engine associated with the vehicle.

A further embodiment of any of the foregoing embodiments may additionally and/or alternatively include the centralized multi engine startup system further comprising multiple vehicles supported within the pallet structure, wherein the multiple vehicles are each fluidly coupled to the umbilical gas line.

A further embodiment of any of the foregoing embodiments may additionally and/or alternatively include the centralized multi engine startup system further comprising a quick release interface in fluid communication with the umbilical gas line, the quick release in operative communication with the propulsion module associated with the at least one vehicle.

In accordance with the present disclosure, there is provided a process for employing a centralized multi engine startup system comprising a pallet structure; supporting an energized gas source with the pallet structure; fluidly coupling an umbilical gas line to the energized gas source; configuring at least one vehicle in operative communication with the umbilical gas line; fluidly coupling a propulsion module with the umbilical gas line; configuring the propulsion module in operative communication with the at least one vehicle; and fixing each of the energized gas source and umbilical gas line to the pallet structure responsive to a vehicle launch from the pallet structure.

A further embodiment of any of the foregoing embodiments may additionally and/or alternatively include the energized gas source comprises at least one of a gas generator and a start cartridge.

A further embodiment of any of the foregoing embodiments may additionally and/or alternatively include the process further comprising producing an energized gas from at least one of the gas generator and the start cartridge; and configuring the energized gas to start a gas turbine engine associated with the vehicle.

A further embodiment of any of the foregoing embodiments may additionally and/or alternatively include the propulsion module comprises a gas turbine engine.

A further embodiment of any of the foregoing embodiments may additionally and/or alternatively include the process further comprising configuring a quick release interface in fluid communication with the umbilical gas line, the quick release in operative communication with the propulsion module associated with the at least one vehicle.

A further embodiment of any of the foregoing embodiments may additionally and/or alternatively include the process further comprising supporting multiple vehicles within the pallet structure; fluidly coupling the multiple vehicles to the umbilical gas line.

A further embodiment of any of the foregoing embodiments may additionally and/or alternatively include the pallet structure being configured to support multiple vehicles for deployment from an aircraft.

Other details of the centralized multi engine startup system are set forth in the following detailed description and the accompanying drawings wherein like reference numerals depict like elements.

BRIEF DESCRIPTION OF THE DRAWINGS

FIG. 3 is a schematic representation of an exemplary centralized multi engine startup system being deployed.

FIG. 4 is a schematic representation of an exemplary centralized multi engine startup system being deployed.

DETAILED DESCRIPTION

Figure 1:
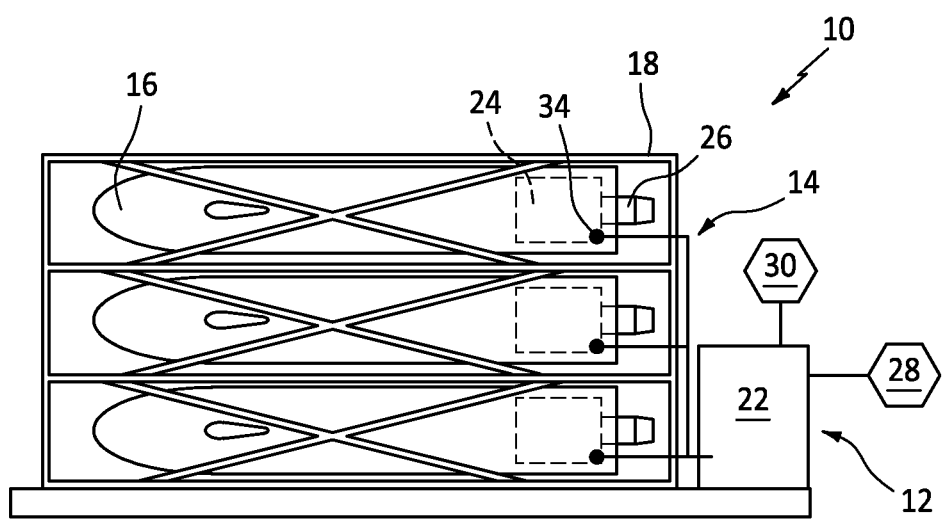
FIG. 1 is a schematic representation of an exemplary centralized multi engine startup system.

Referring now to FIG. 1 through FIG. 4, there is illustrated an exemplary centralized multi engine startup system 10. The centralized multi engine startup system 10 can include an energized gas source 12 fluidly coupled to an umbilical gas line 14. The umbilical gas line 14 is fluidly coupled to at least one vehicle 16. In the embodiment shown, multiple vehicles 16 are supported by a storage structure 18 (e.g., pallet structure 18, or the like). The pallet structure 18 is configured to rack and stack multiple vehicles 16 for deployment from an aircraft 20. The centralized multi engine startup system 10 is in operative communication with the pallet structure 18.

The umbilical gas line 14 is manifolded and fluidly coupled to each vehicle 16 and configured to supply energized gas 22 from the energized gas source 12 connected to a propulsion module 24 of the vehicle 16, providing necessary gas supplies to start the engine 26 of each vehicle 16 during palletized delivery. The centralized multi engine startup system 10 is configured to provide energized gas 22 for ignition and gas expansion along with an oxygen supply required to enrich the combustor air of the engine 26.

In an exemplary embodiment, the energized gas source 12 can include a gas generator 28 and/or start cartridge 30 configured to generate the energized gas 22. The start cartridge 30 can include a chemical mixture that reacts upon ignition to generate the energized gas 22. In exemplary embodiments, the gas generator 28 and/or start cartridge 30 can be a tank with compressed gas or any device configured to produce the energized gas 22 to spin the engine 26.

Figure 2:
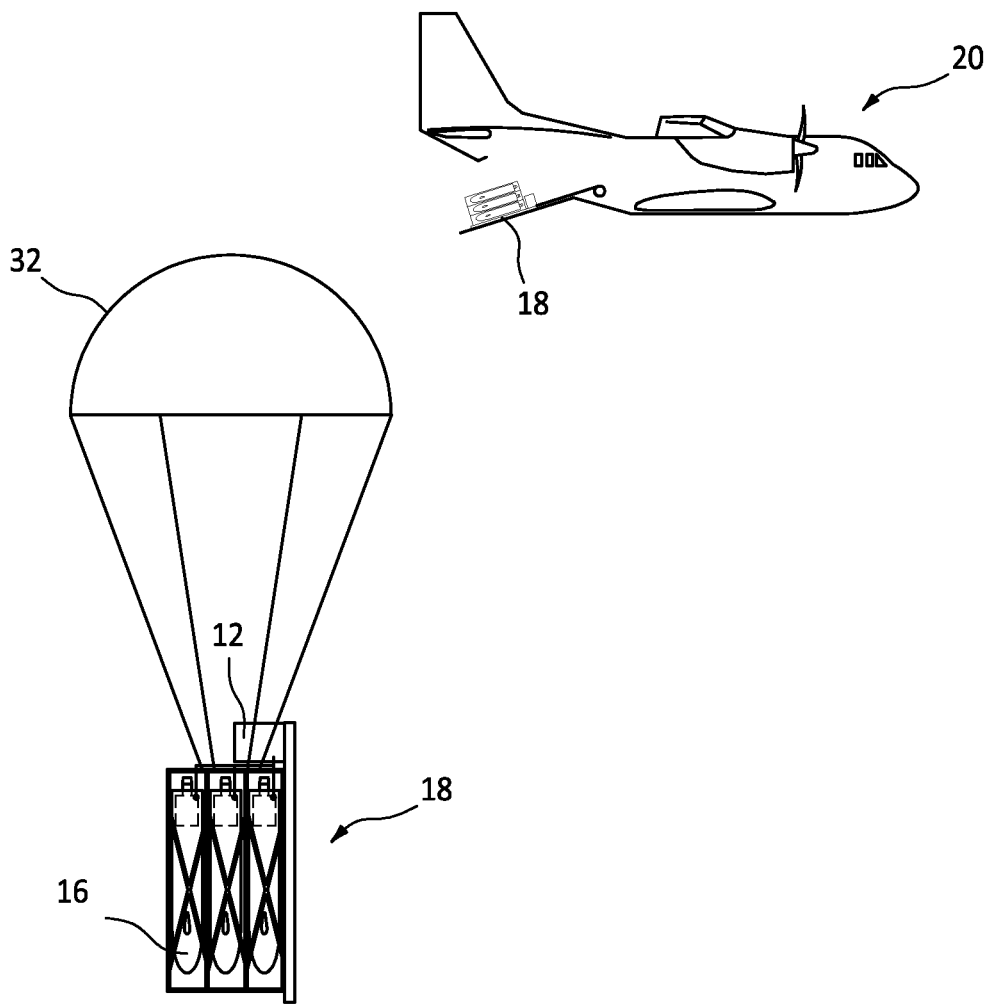
FIG. 2 is a schematic representation of an exemplary centralized multi engine startup system being deployed.

Referring also to FIG. 2 through FIG. 4, in operation, the centralized multi engine startup system 10 is employed with the pallet structure 18 and remains with the pallet structure 18. As the pallet structure 18 containing multiple vehicles 16 is deployed from the aircraft 20, the pallet structure 18 can be ejected from the aircraft 20. A drag-chute 32 deploys and orients the pallet structure 18 for proper alignment relative to gravitational forces and aerodynamic forces optimal for launching the vehicles 16. In another exemplary embodiment, as shown in FIG. 2, it is possible for the pallet structure 18 to remain onboard the aircraft 20. During deployment, pallet ejection and orientation, the propulsion module 24 remains inactive. Upon proper initiation conditions, the gas generator 28 engages and supplies the energized gas 22 through the umbilical gas line 14 to each individual vehicle 16. The energized gas 22 includes rapidly expanding gas and oxygen. The umbilical gas line 14 is fluidly coupled with a quick release interface 34. The quick release interface 34 is configured to remain coupled during energized gas 22 injection but then decouple upon vehicle safe separation mode. The quick release interface 34 is fluidly coupled to the engine turbine rotor as well as the combustor of the engine 26. At this point of the deployment, the engine 26 starts and is in an idle mode.

After engine idle mode has been attained, the vehicle(s) 16 can be released from the pallet structure 18 under the safe separation mode. The FIG. 4, shows the various stages of deployment, safe separation, engine start, full start and wing deployment so that the vehicle can proceed with the predetermined mission.

The energized gas source 12 along with the gas generator 28 and/or start cartridge 30 and umbilical gas line 14 remain with the pallet structure 18. The pallet structure 18 can be retained and reused for additional missions.

A technical advantage of the disclosed centralized multi engine startup system can include combining the starting elements of each of the engines for the vehicles onto a central pallet location.

Another technical advantage of the disclosed centralized multi engine startup system can include weight reduction in each vehicle.

Another technical advantage of the disclosed centralized multi engine startup system can include less costly vehicle engine start system components.

Another technical advantage of the disclosed centralized multi engine startup system can include allowance for more space on the vehicle for use with additional fuel storage and/or more electronics.

There has been provided a centralized multi engine startup system. While the centralized multi engine startup system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A centralized multi engine startup system comprising:
   a pallet structure;
   an energized gas source supported by the pallet structure;
   an umbilical gas line fluidly coupled to the energized gas source; and
   at least one vehicle in operative communication with the umbilical gas line, wherein each of the energized gas source and umbilical gas line are coupled to the pallet structure and remain with the pallet structure responsive to a vehicle launch from the pallet structure.

2. The centralized multi engine startup system according to claim 1, wherein the energized gas source comprises at least one of a gas generator and a start cartridge.

3. The centralized multi engine startup system according to claim 2, wherein the gas generator and the start cartridge are configured to produce an energized gas configured to start a gas turbine engine associated with the vehicle.

4. The centralized multi engine startup system according to claim 1, wherein the umbilical gas line is fluidly coupled to a propulsion module in operative communication with the vehicle.

5. The centralized multi engine startup system according to claim 1, further comprising:

the at least one vehicle comprises two or more vehicles supported within the pallet structure, wherein the two or more vehicles are each fluidly coupled to the umbilical gas line.

6. The centralized multi engine startup system according to claim 1, further comprising:
a quick release interface in fluid communication with the umbilical gas line, the quick release in operative communication with a propulsion module associated with the vehicle.

7. The centralized multi engine startup system according to claim 1, wherein the pallet structure is configured to support two or more vehicles for deployment from an aircraft.

8. A centralized multi engine startup system comprising:
a storage structure;
an energized gas source supported by the storage structure;
an umbilical gas line fluidly coupled to the energized gas source; and
at least one vehicle in operative communication with the umbilical gas line;
a propulsion module fluidly coupled to the umbilical gas line; the propulsion module in operative communication with the at least one vehicle, wherein each of the energized gas source and umbilical gas line are coupled to the storage structure and remain with the storage structure responsive to a vehicle launch from the storage structure.

9. The centralized multi engine startup system according to claim 8, wherein the propulsion module comprises a gas turbine engine.

10. The centralized multi engine startup system according to claim 8, wherein the energized gas source comprises at least one of a gas generator and a start cartridge.

11. The centralized multi engine startup system according to claim 10, wherein the gas generator and the start cartridge are configured to produce an energized gas configured to start a gas turbine engine associated with the vehicle.

12. The centralized multi engine startup system according to claim 8, further comprising:
the at least one vehicle comprises two or more vehicles supported within the storage structure, wherein the two or more vehicles are each fluidly coupled to the umbilical gas line.

13. The centralized multi engine startup system according to claim 8, further comprising:
a quick release interface in fluid communication with the umbilical gas line, the quick release in operative communication with the propulsion module associated with the at least one vehicle.

14. A process for employing a centralized multi engine startup system comprising:
a storage structure;
supporting an energized gas source with the storage structure;
fluidly coupling an umbilical gas line to the energized gas source;
configuring at least one vehicle in operative communication with the umbilical gas line;
fluidly coupling a propulsion module with the umbilical gas line;
configuring the propulsion module in operative communication with the at least one vehicle; and
fixing each of the energized gas source and umbilical gas line to the storage structure responsive to a vehicle launch from the storage structure.

15. The process of claim 14, wherein the energized gas source comprises at least one of a gas generator and a start cartridge.

16. The process of claim 15, further comprising:
producing an energized gas from at least one of the gas generator and the start cartridge; and
configuring the energized gas to start a gas turbine engine associated with the vehicle.

17. The process of claim 14, wherein the propulsion module comprises a gas turbine engine.

18. The process of claim 14, further comprising:
configuring a quick release interface in fluid communication with the umbilical gas line, the quick release in operative communication with the propulsion module associated with the at least one vehicle.

19. The process of claim 14, further comprising:
supporting the at least one vehicle comprising two or more vehicles within the storage structure;
fluidly coupling the two or more vehicles to the umbilical gas line.

20. The process of claim 14, wherein the storage structure is configured to support the at least one vehicle comprising two or more vehicles for deployment from an aircraft.

* * * * *